A. LAFEVER.
BOARD MEASURE.

No. 25,423.

Patented Sept. 13, 1859.

Witnesses.
George C. Barnes.
C. A. Wheeler.

Inventor.
Augustus Lafever

UNITED STATES PATENT OFFICE.

AUGUSTUS LAFEVER, OF BATTLE CREEK, MICHIGAN.

BOARD-MEASURER.

Specification of Letters Patent No. 25,423, dated September 13, 1859.

*To all whom it may concern:*

Be it known that I, AUGUSTUS LAFEVER, of Battle Creek, in the county of Calhoun and State of Michigan, have invented a new and Improved Device for Measuring Boards and other Lumber; and I do hereby declare that the following is a full, clear, and exact description of the same, reference being had to the annexed drawings, making a part of this specification, in which—

Figure 3:
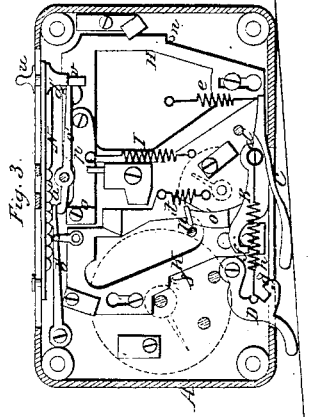
Figure 5:
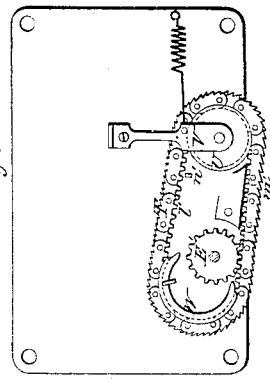
Figure 2:
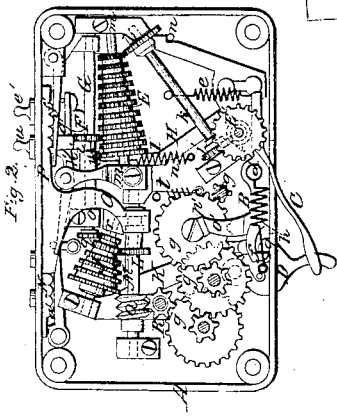
Figure 1:
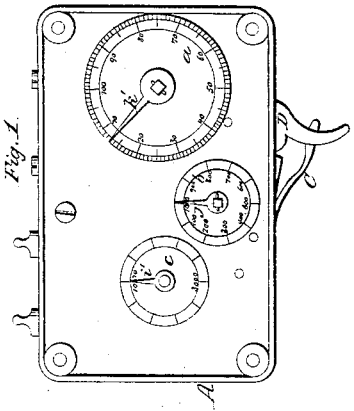
Figure 4:
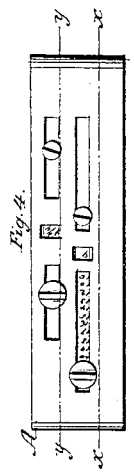

Figure 1, is a face view of my invention. Fig. 2, is an internal view of ditto, taken in the line $x$, $x$, Fig. 4. Fig. 3, is an internal view of ditto, taken in the line $y$, $y$, Fig. 4. Fig. 4, a plan or top view of ditto. Fig. 5, a detached inner side view of the face plate of ditto.

Similar letters of reference indicate corresponding parts in the several figures.

The object of this invention is to obtain a portable instrument or device by which the aggregate number of square feet in a lot of lumber composed of pieces of varying lengths and thicknesses may be ascertained by simply passing the instrument transversely over the pieces in the direction of their width, the instrument being capable of adjustment to suit the length and thickness of the pieces.

To enable those skilled in the art to fully understand and construct my invention I will proceed to describe it.

A, represents a square or quadrilateral case, the front or face side of which is provided with three graduated dials, $a$, $b$, $c$, the plate $a$, being graduated into tens, the plate $b$, into hundreds and $c$, into thousands, as shown clearly in Fig. 1.

B, is a stop lever which is secured within the case A, by a fulcrum pin $d$. This lever has an arm C, attached to it, which arm projects down through the bottom of the case A, a spring $e$, which is connected to the inner end of the lever B, having a tendency to keep the outer end forced down and out of the case, see Figs. 2 and 3. One end of the stop lever is of hook-form, as shown at $f$, and this hook catches on a projection $g$, on a lever D, which serves as a guide in starting the device or applying it properly to its work. A spring $h$, is attached to the lever D, which spring has a tendency to keep the projection $g$, within the hook $f$, as shown in Fig. 2.

E', is a pinion within the case A, the shaft of which has a screw $i$, on it that gears into a pinion $j$, on a shaft $k$, said shaft having a toothed wheel $l$, on it which wheel gears into one of the wheels of a cone of gears E, shown in Fig. 2. The axis of the cone E, is fitted in permanent bearings $m$.

F, is a sliding pinion which is placed on a shaft G, within the case A. The bearings of the shaft G, are attached to a yielding frame H, which is fitted between proper guides or pins $n$, and has a spring I, attached to it, said spring having a tendency to keep the pinion F, in gear with the cone E. One of the bearings $o$, of the shaft G, is attached to a pivoted piece $p$, of the frame, as shown clearly in Fig. 3, so that an independent play or movement is allowed said bearing. The end of the shaft G, adjoining the bearing $o$, has a pinion $q$, placed on it and this pinion gears into a pinion $r$, which is placed on the axis of a cone of gears J, see Fig. 2. The axis of the cone J has its bearings attached to a yielding frame K, fitted between suitable guides or pins $s$, said frame K, having a spring $t$, attached to it which spring has a tendency to keep the cone J, in gear with a sliding pinion L, on a shaft M, the journals of which are fitted in permanent bearings.

The sliding pinion F, on the shaft G, has a collar $u$, attached to one side of it and this collar has a forked arm $v$, fitted on it, said arm being attached to a slide N, which works against the under side of the top plate of the case and has a thumb piece $w$, attached to it. The upper surface of the slide N, is graduated and its under side has a rack $a'$, formed on it, said rack bearing against a lever $b'$, which bears against a similar lever $c'$, connected with the frame H, of the shaft G, as shown at $d'$.

To the sliding pinion L, on shaft M, an arm O, is attached, said arm being connected to a slide P, which works against the under side of the top plate of the case A, and has a thumb piece $e'$, attached to it. The upper surface of the slide P, is graduated, and a rack $f'$, is formed on its under side, said rack bearing on a lever $g'$, which bears on a lever $h'$, connected with the frame K.

On the shaft M, a screw Q, is placed permanently. This screw gears into a pinion R, which sets in motion a train of gear S, so arranged as to operate the indexes $i'$, $j'$, $k'$, and cause the same to move over the graduated plates $a$, $b$, $c$, with a proper relative speed.

T, is an endless chain which passes around a pulley U, having its bearing in a yielding bar V, the chain also passing around a semicircular guide W. This chain T, is provided at its inner edge with rack teeth $l'$, and its outer edge has saw-shaped projections $m$, as shown clearly in Fig. 5. The chain T, is at the inner side of the front plate of the case and it projects below the bottom of the case. To the inner side of the front plate and within the chain T, a stop $n'$, is attached, and to the lever B, an arm $o$, is attached, said arm having a right angular projection $p'$ at its end which passes over the top of chain T, and has on account of the spring $e$, a tendency to keep the chain T, in gear with the stop $n$. The teeth $l'$, of the chain T, gears into the pinion E'.

The operation is as follows: The device is shoved transversely across the board to be measured, the lever D, serving as a stationary guide. The arm C, is pressed upward by the operator in pressing down the device on the board and the lever D, is thereby freed from the lever B, and the projections $p'$, of arm $o'$, is turned up so as to free the chain T, from the stop $n'$. As the implement is shoved along over the board transversely, the chain T, is actuated and the latter rotates the pinion E', motion from which is communicated to the shaft $h$, by the gear $i$, $j$, the pinion $l$, gives motion to the cone gear E, and the latter through the medium of the sliding pinion F, and pinion $q$ gives motion to the cone gear J, motion being communicated to the train of gear S, from J, by the gearing L, Q, R. The indexes $i'$, $j'$, $k'$, register or designate the number of square feet in a board or in any number of boards the implement has been passed over, the length and width of the board being given and the sliding pulleys F, L, adjusted accordingly so as to gear properly with the cones E, J, for instance. If a board 10 feet long and 1 inch thick is to be measured the slide N, is so adjusted that the figure 10, on the slide will be in a space or opening in the top of the case, and at this position of said slide the pinion F, will be in gear with the smallest wheel in the cone E, and by adjusting the slide P, so that the figure 1, on it will be in a space or opening in the top of the case, the pinion L, will register with the wheel $a^x$ of the cone J. This position of the pinions F, L, will give the superficial measurement of the board or the aggregate measurement of any number of boards of the above specified length and thickness. In case a board be of the same length as above specified 10 feet but double the thickness 2 inches, the slide P, is adjusted so as to bring the figure 2, on the upper surface of said slide in the space or opening in the top of the case. By this adjustment the pinion L, is made to gear into the wheel $b^x$, of the cone J, and the board will measure as indicated by the indexes just double that of the one 1 inch thick, it being understood that the boards or lumber are measured superficially, a thick board or one exceeding 1 inch, having the surplus thickness added to its superfice. It will be seen therefore that the adjustment of the pinions L, F, and the employment of the cone gear is to regulate the relative speed of the chain T, and train of gear S, in order to effect the desired result.

The arrangement of the yielding frames H, K, racks $a'$, $f'$, and levers $b'$, $c'$, $g'$, $h'$, is to admit of the ready adjustment of the pinions E, L, said arrangement allowing the pinions E, to be disengaged from the cones and readily adjusted.

Having thus described my invention what I claim as new and desire to secure by Letters Patent, is,

1. The employment or use of the cone gears E, J, and sliding pinions F, L, in connection with an endless toothed or serrated chain T, fitted within with a suitable case, arranged with gearing and indexes and with or without the arm C, and lever D, substantially as and for the purpose set forth.

2. The arrangement of the yielding frames H, K, with the pinion F, and cone gear J, respectively attached, the levers $b'$, $c'$, $g'$, $h'$, and racks $a'$, $f'$, substantially as and for the purpose specified.

AUGUSTUS LAFEVER.

Witnesses:
GEORGE C. BARNES,
C. A. WHELER.